United States Patent
Mattern

(10) Patent No.: US 7,593,857 B2
(45) Date of Patent: Sep. 22, 2009

(54) SELECTIVELY EXPANDING AND PRINTING INDICIA INFORMATION

(75) Inventor: James M. Mattern, Bethany, CT (US)

(73) Assignee: Neopost Technologies, Bagneux (FR)

(*) Notice: Subject to any disclaimer, the term of this patent is extended or adjusted under 35 U.S.C. 154(b) by 793 days.

(21) Appl. No.: 11/191,090

(22) Filed: Jul. 27, 2005

(65) Prior Publication Data

US 2006/0036557 A1 Feb. 16, 2006

Related U.S. Application Data

(60) Provisional application No. 60/591,491, filed on Jul. 27, 2004.

(51) Int. Cl.
| | |
|---|---|
| *G07B 17/00* | (2006.01) |
| *B41J 2/01* | (2006.01) |
| *B41J 29/38* | (2006.01) |
| *B41J 2/205* | (2006.01) |
| *G06F 3/12* | (2006.01) |
| *G06F 15/00* | (2006.01) |
| *G06K 1/00* | (2006.01) |

(52) U.S. Cl. .................. 705/1; 705/401; 358/1.1; 358/1.2; 358/1.9; 347/1; 347/5; 347/14

(58) Field of Classification Search .............. 705/1, 705/401
See application file for complete search history.

(56) References Cited

U.S. PATENT DOCUMENTS

| | | | | |
|---|---|---|---|---|
| 5,243,908 A | | 9/1993 | Gilham | 101/232 |
| 5,263,994 A | * | 11/1993 | Ueda | 400/157.3 |
| 5,293,465 A | | 3/1994 | Abumehdi et al. | 395/113 |
| 5,526,271 A | | 6/1996 | Abumehdi | 364/464.02 |
| 5,668,729 A | | 9/1997 | Herbert | 364/464.2 |
| 5,683,190 A | | 11/1997 | Gawler | 400/582 |
| 5,745,887 A | * | 4/1998 | Gargiulo et al. | 705/410 |
| 5,871,288 A | * | 2/1999 | Ryan et al. | 400/103 |
| 5,917,925 A | * | 6/1999 | Moore | 382/101 |
| 6,050,054 A | | 4/2000 | Van Lierde et al. | 53/284.3 |
| 6,540,325 B2 | * | 4/2003 | Kawamura et al. | 347/40 |
| 6,607,095 B2 | | 8/2003 | Bernard et al. | 221/226 |
| 6,739,687 B1 | * | 5/2004 | Rasmussen et al. | 347/14 |
| 6,795,813 B2 | | 9/2004 | Allport et al. | |
| 6,834,929 B1 | * | 12/2004 | Adams et al. | 347/19 |
| 2002/0127040 A1 | * | 9/2002 | Davies et al. | 400/76 |
| 2004/0093312 A1 | * | 5/2004 | Cordery et al. | 705/401 |
| 2005/0179916 A1 | * | 8/2005 | Mantell | 358/1.9 |

OTHER PUBLICATIONS

Pintsov and Vastone; "Postal Revenue Collection in the Digital Age"; Springer-Verlag Berlin Heidelberg; Financial Cryptography; Jan. 1, 2001.*

\* cited by examiner

*Primary Examiner*—John W Hayes
*Assistant Examiner*—Kevin Flynn
(74) *Attorney, Agent, or Firm*—Townsend and Townsend and Crew LLP

(57) ABSTRACT

A method of producing a barcode includes collecting a set of information for producing the bar code, using an indicator to designate the set of information, encoding the indicator in the barcode, expanding the barcode to a particular size, and printing the bar code.

16 Claims, 4 Drawing Sheets

600

510

600

SELECTIVELY EXPANDING AND PRINTING INDICIA INFORMATION

This application claims the benefit of U.S. Provisional Application No. 60/591,491 filed Jul. 27, 2004 which is incorporated by reference herein in its entirety.

BACKGROUND

The disclosed embodiments relate to selectively expanding and printing barcoded information.

BRIEF DESCRIPTION OF RELATED DEVELOPMENTS

Mailing machines or postage meters enable users to frank one or more mail items by printing a stamp representing the amount paid by the sender. For example, U.S. Pat. Nos. 5,243,908; 5,683,190; 5,526,271; 6,607,095; 6,050,054; 5,293,465; 5,688,729; all of which are incorporated herein by reference in their entirety; disclose franking machines which may comprise franking heads, feeders, folders and user interfaces as examples.

A high volume postal customer may use a postage meter which incorporates a Postal Security Device (PSD) to secure the proof of payment of postal indicia. In an exemplary application, indicia may be applied to mailing items that identifies the value of the postage applied and other information. A customer may purchase postage and the purchased value may be stored in the PSD. As the postage indicia is applied to items, the value applied may be deducted from the stored value. Once postage indicia is applied, the item may then be dropped into the collection stream of the particular postal system and subsequently processed for delivery.

Barcoded indicia generally occupies about 1 square inch, may require 2 pens and 1 printhead to print, and may require a resolution of approximately 300 DPI. Alignment among multiple devices such as pens and printheads can be difficult to achieve and maintain.

Furthermore, the printing devices themselves print at a rate much slower than typical media transport speeds. For example, a typical printhead may be capable of printing 300 DPI on media travelling at a maximum of 55 inches/second. Using envelopes as an example, this translates to approximately 15 thousand envelopes/hour.

Typical media transport devices are capable of moving media at much faster speeds. A method of constructing indicia that allows for faster printing and that uses less ink would be advantageous.

SUMMARY OF THE DISCLOSED EMBODIMENTS

In accordance with one exemplary embodiment, a method of producing a barcode includes collecting a set of information for producing the bar code, using an indicator to designate the set of information, encoding the indicator in the barcode, expanding the barcode to a particular size, and printing the bar code.

In accordance with another exemplary embodiment, a method of producing a postal indicia barcode includes collecting a set of information for producing the postal indicia barcode, using a serial number to indicate the set of information, encoding the serial number into the postal indicia a barcode, expanding the barcode to a particular size, and applying the postal indicia bar code to a mail piece.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENTS

Figure 1:
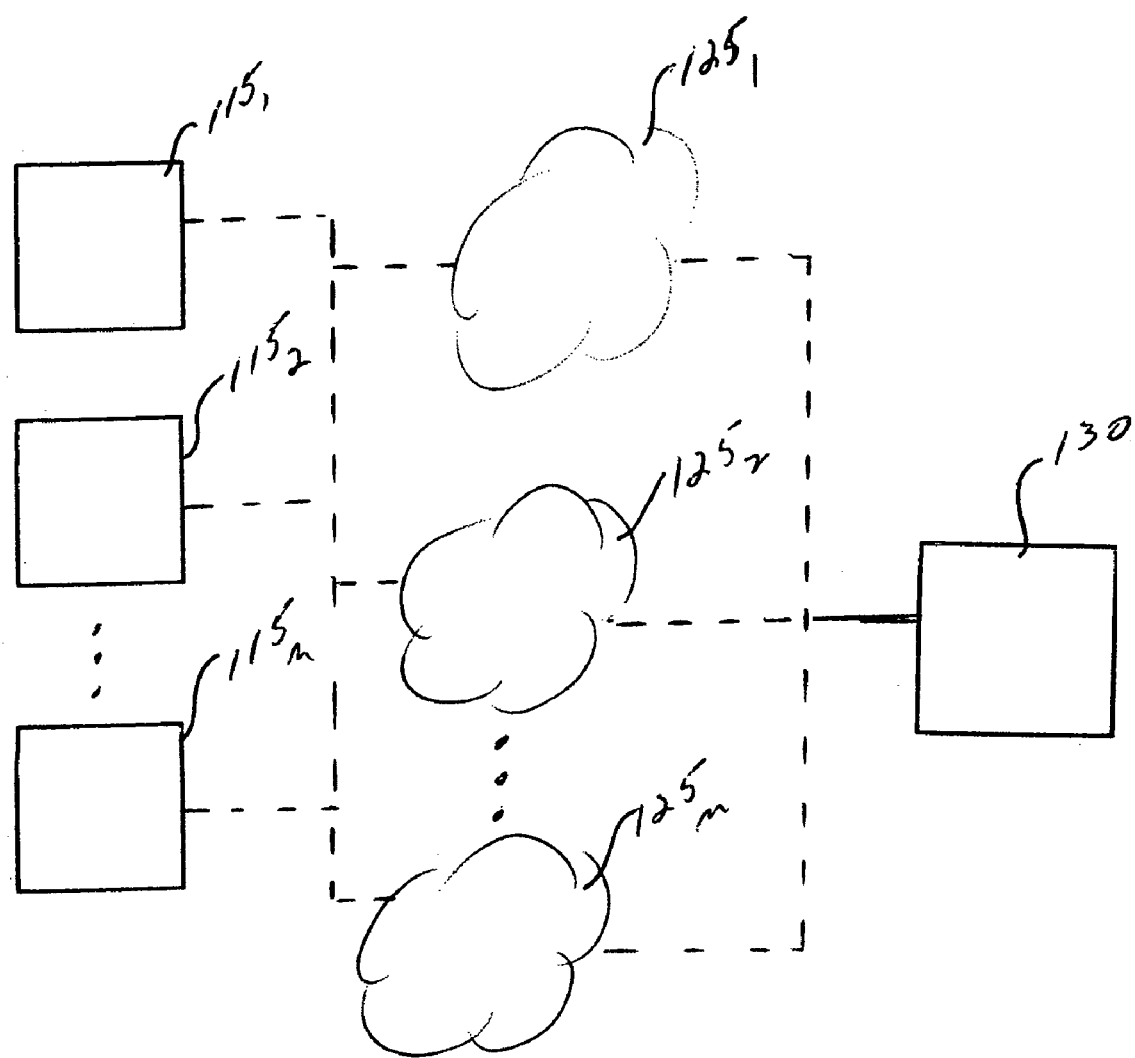
FIG. 1 shows a block diagram of a system suitable for practicing the disclosed embodiments.

FIG. 1 shows a block diagram of a system 100 suitable for practicing the disclosed embodiments disclosed herein. Although the disclosed embodiments will be described with reference to the embodiment shown in the drawings, it should be understood that the disclosed embodiments can be embodied in many alternate forms of embodiments. In addition, any suitable size, shape or type of elements or materials could be used.

It is a feature of the disclosed embodiments to produce a barcode with a reduced set of unique information. It is another feature of the disclosed embodiments to expand the reduced barcode to a particular size such that the bar code may be printed at a lower resolution or with less ink or both.

System 100 includes one or more funding devices, shown in FIG. 1 as meters $115_1 \ldots 115_n$ and a postal infrastructure data center 130 connected to the meters $115_1 \ldots 115_n$ through one or more networks $125_1 \ldots 125_n$.

Figure 2:
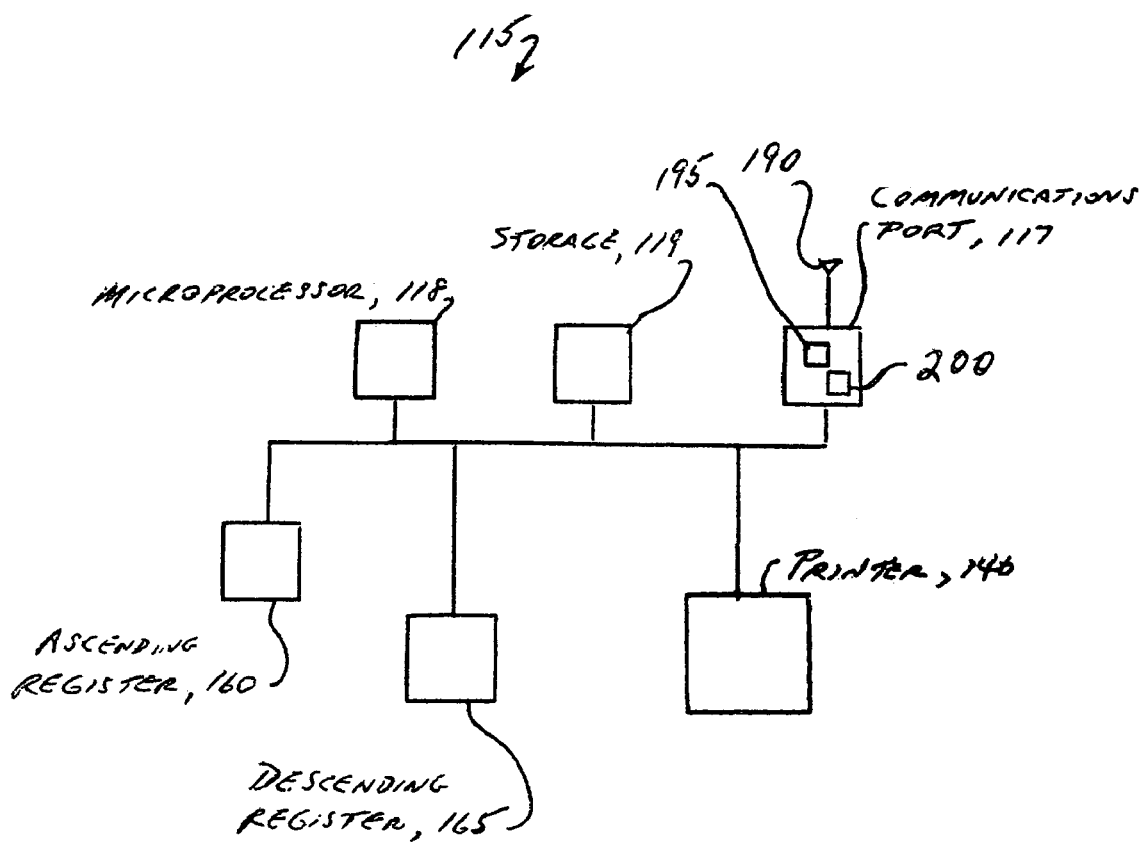
FIG. 2 shows a block diagram of meter according to the disclosed embodiments.

FIG. 2 shows a general block diagram of meter 115. Meter 115 may include a communications port 117 and a microprocessor 118 for performing electronic accounting functions, control functions, and franking functions according to programs stored in a storage device 119. Some of these functions or subsets of these functions may be grouped within a secure perimeter as what is commonly referred to as a Postal Security Device (PSD).

Storage device 119 generally stores machine readable program code which is adapted to cause microprocessor 118 to perform the functions of the disclosed embodiments including producing bar coded indicia, a reduced bar code, and an expanded bar code as described below. Storage device 119 may utilize optical, magnetic, semiconductor, electronic, or other types of suitable devices to store the program code.

Microprocessor 118 typically performs the electronic accounting functions in relation to franking items. Data associated with the accounting functions may include an accumulated total value of credit entered into the PSD, an accumulated total value of charges dispensed by the PSD by franking items, a count of the number of items franked, and a count of the number of items franked with a charge in excess of a predetermined value. The accumulated total value of credit may be stored in an ascending credit register 160, the accumulated total value of postage charges dispensed may be stored in a descending register 165, and the count of items may be stored in an items count register 170. The various registers may be located in storage device 119.

The franking functions performed by microprocessor 118 typically include collecting and processing information to produce indicia, for example, an electronic signature, information regarding the mail piece, mail piece origin, meter information, indicia amount, etc. The franking functions may also include reporting the number of items, value marked and other parameters to the accounting functions.

The control functions performed by microprocessor 118 may include utilizing communications port 117 to communicate with the postal infrastructure data center 130. Communications port 117 generally includes an antenna 190 and support circuitry 195 or other signaling devices 200 for communicating with the postal infrastructure data center 130 through the one or more networks $125_1 \ldots 125_n$.

The signaling devices 200 may provide an air interface, a wired interface, a wireless interface, or an electrical, electromagnetic, radio, infrared, or other suitable facility for communication. The support circuitry 195 may also include location determining circuitry, for example, a GPS facility for determining the location of the meter 115.

The postal infrastructure data center 130 generally has the capability to access one or more of the meters $115_1 \ldots 115_n$ to exchange information as required. For example, the postal infrastructure data center 130 may access meters $115_1 \ldots 115_n$ to download additional features, updates, upgrades, programs, diagnostic functions, delivery confirmation or other types of information. The postal infrastructure data center 130 may access meters $115_1 \ldots 115_n$ to retrieve information including accounting data, status data, and indicia information according to the disclosed embodiments.

In one embodiment, communication between meters $115_1 \ldots 115_n$ and the postal infrastructure data center 130 may be wireless. In other embodiments, the communication may occur through a combination of wireless and wired connections, or only wired connections.

Postal infrastructure data center 130 may initiate a data exchange by initially detecting the one or more communications networks $125_1 \ldots 125_n$ suitable for the data exchange. Postal infrastructure data center 130 may logon or establish a connection to a particular communications network 125 by addressing a message specifically to that communications network. Alternately, Postal infrastructure data center 130 may identify that one or more communications networks $125_1 \ldots 125_n$ are available for providing communications and may perform a selection process among the available communications networks $125_1 \ldots 125_n$. For example, postal infrastructure data center 130 may broadcast polling or paging signals in attempt to receive a response from a communication network. In the event that more than one communication network responds, meter 115 may select a responding network based on any combination of signal strength, quality of service, connection speed, cost, etc.

Communication networks $125_1 \ldots 125_n$ may include any suitable communications network, for example, the Public Switched Telephone Network (PSTN), a wireless network, a wired network, a Local Area Network (LAN), a Wide Area Network (WAN), virtual private network (VPN), an air interface, etc. The air interface may include any suitable wireless communication protocols or signaling techniques or standards, for example TDMA, CDMA, IEEE 802.11, Bluetooth, close range RF, optical, any appropriate satellite communication standards, etc.

In one embodiment, postal infrastructure data center 130 may utilize cell communication technology and identify a cellular communication network from the one or more networks $125_1 \ldots 125_n$ using roaming techniques.

After postal infrastructure data center 130 has established a connection with an appropriate communication network 125, postal infrastructure data center 130 then attempts to logon or establish a connection to one or more meters $115_1 \ldots 115_n$. Postal infrastructure data center 130 may attempt to connect to an individual meter 115 by addressing a message specifically to that meter 115. Alternately, postal infrastructure data center 130 may identify that one or more meters $115_1 \ldots 115_n$ are available for communication.

For example, postal infrastructure data center 130 may attempt to identify any meters $115_1 \ldots 115_n$ connected to networks $125_1 \ldots 125_n$, for example by polling network addresses or other identification techniques. Postal infrastructure data center 130 may also attempt to identify meters $115_1 \ldots 115_n$ by broadcasting a paging signal or other type of signal that requests a response. In an embodiment using cell communication technology, postal infrastructure data center 130 may place a call to one or more meters $115_1 \ldots 115_n$.

Postal infrastructure data center 130 may be capable of establishing more that one connection to a particular meter 115 and may be capable of establishing a connection to more than one meter $115_1 \ldots 115_n$ simultaneously. For example, postal infrastructure data center 130 may establish a first connection to a first meter $115_1$ for fund replenishment and, during the first connection, may establish a second connection to the first meter $115_1$ to download data tables. As another example, postal infrastructure data center 130 may establish a first connection to a first meter $115_1$ for fund replenishment and, during the first connection, may establish a second connection to a second meter $115_2$ to download data tables.

Figure 3:
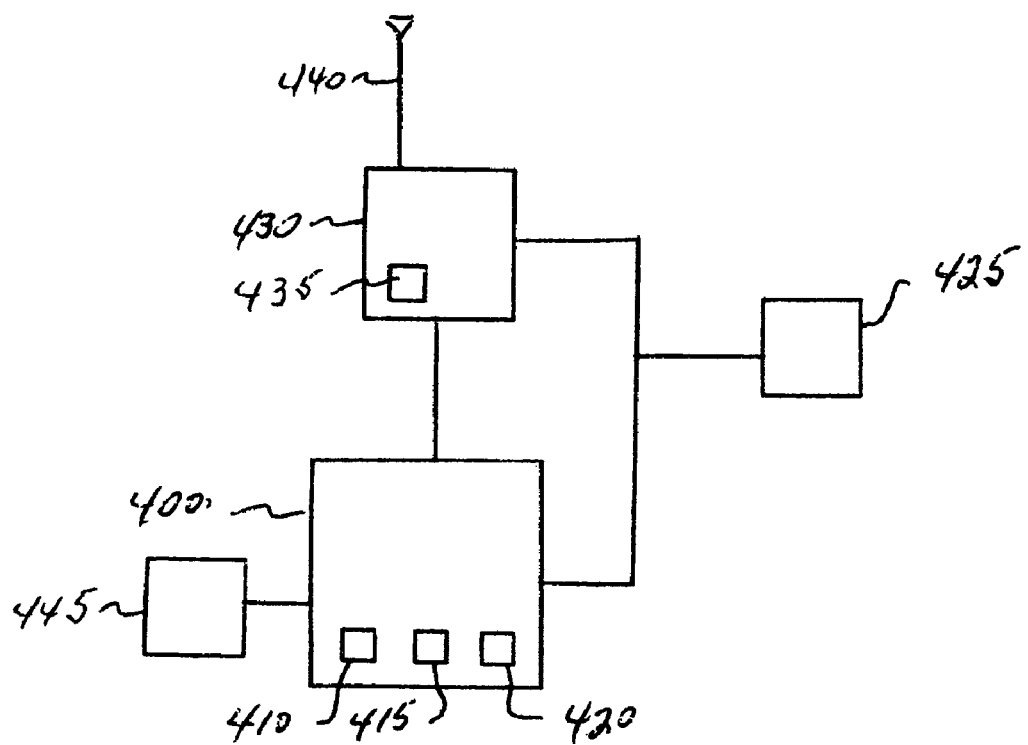
FIG. 3 shows a diagram of a postage infrastructure data center.

Referring to FIG. 3, the postal infrastructure data center 130 may generally include a server 400, several data bases 410, 415, 420, a power facility 425, for example, a power distribution network, and communication circuitry 430. Communication circuitry 430 may include an antenna 440 and other circuitry and devices 435 for communication with meters $115_1 \ldots 115_n$ through the one or more networks $125_1 \ldots 125_n$.

In other embodiments, devices 435 may include suitable circuitry, programs, transmitters and receivers for any appropriate type of wireless communication utilizing radio frequency (RF), infrared (IR), optical, acoustical, any type of electromagnetic based technology, or any other type of wireless communication. The postal infrastructure data center 130 may also include a user interface facility 445 which may provide local users with access to postal infrastructure data center services.

Returning to FIG. 2, the meter 115 generally provides indicia services locally utilizing a printer 140 and may be capable of franking a label, directly franking a mail piece, or franking any other suitable substrate. Meter 115 is advantageous in that a user may place meter 115 in a specific location on or over a substrate and frank or print an object.

The printer 140 may be capable of printing an indicia barcode on any suitable substrate or media, including an adhesive or tacky substrate, and may also be capable of applying a covering over the printed items. For example, the printer 140 may be capable of applying a film or coating over a printed item for protection or to prevent tampering.

The printer 140 may be an inkjet, dye sublimation, thermal wax, laser, electrostatic, xerographic, thermal, RF, or any suitable type of printer. In one embodiment, printer 140 may utilize energy beams, having high or low power, for example, RF beams, to print directly onto a substrate. The meter may be capable of generating and the printer 140 may be capable of printing stamps, barcodes, addresses, planet codes, images, text, indicia, logos, graphics, or any other printable item in any desired order.

Figure 4:
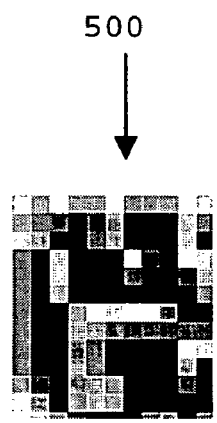
FIG. 4 shows a prior art bar code.

FIG. 4 shows a typical indicia barcode 500. The typical indicia barcode 500 may include an electronic signature, information regarding the mail piece, mail piece origin, meter information, indicia amount, etc. The barcode generally requires about 89 bytes of information, commonly occupies approximately 1 square inch, and is normally required to be printed at 300 dots per inch (DPI). A number of printing devices within the printer 140, for example, 2 pens and 1 printhead, are usually required to print such a barcode. As a result, precise alignment of the printing devices is required, the time required to print the barcode is relatively long, and printing the barcode uses a relatively large amount of ink.

Figure 5:
FIG. 5 shows a reduced bar code according to the disclosed embodiments.

FIG. 5 shows a reduced barcode 510 according to the disclosed embodiments. The reduced barcode 510 is unique and has a limited amount of information, for example, the amount of funds the indicia represents and a serial number. In one embodiment, the reduced barcode 510 may only require approximately 22 bytes of information and may only occupy approximately 8 square mm when printed. Such a barcode is advantageous because it may be printed using a single pen.

The reduced bar code 510 may be produced by the meter 115. As part of an indicia producing operation, meter 115 may collect all the necessary information to produce a conventional indicia and store the collected information within storage 119 indexed by a serial number, or otherwise using a serial number or some other indicator to point to or designate the collected information. The meter may also transmit the collected information to the postal infrastructure data center 130 for storage. In one embodiment, the amount of funds the indicia represents and the serial number are encoded in the reduced bar code 510. In another embodiment, the reduced bar code 510 may simply include the serial number and the funds amount may be included with the collected information.

Figure 6:
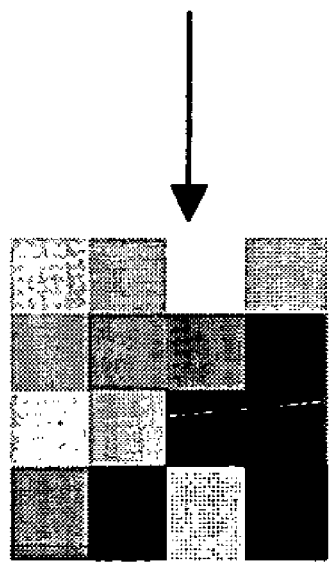
FIG. 6 shows an expanded bar code according to the disclosed embodiments.

As shown in FIG. 6, because the reduced barcode 510 occupies a relatively small area relative to the printing capability of the pen, the reduced barcode may be expanded to occupy a larger area. In one embodiment, the area of the expanded barcode 600 may be the printing width of the pen. The information conveyed by the expanded barcode 600 is the same as the information in the reduced barcode 510 but it occupies a larger area.

Because the reduced barcode 510 has been expanded and now the same information content occupies more area, the relative resolution required of the pen may be reduced, for example, from 300 DPI to 150 DPI, and the information in the expanded barcode 600 would still be readable even if some information or dots were lost due to the reduction in resolution.

As another advantage, because of its low resolution requirement, the expanded barcode 600 may be printed using significantly less ink. In this example, the expanded barcode 600 would still be readable even if some portion of the expanded bar code 600 were lost due to using less ink.

In order to ensure uniqueness, the reduced or expanded barcode may be processed or created using the ascending register 160 of the meter 115. Other processing techniques may also be used to create a unique reduced or expanded barcode.

The expanded bar code may be applied to a substrate, for example, an envelope or a mail piece, etc. and the envelope or mail piece may be inserted into a carrier's mail stream. The carrier may read and decode the expanded indicia and use the serial number or the other indicator to access the meter 115 or the postal data center infrastructure 130 to obtain the collected information, for example, to verify funds information.

Thus the disclosed embodiments allow for the production of a barcode with a reduced set of unique information, and allow for expansion of the reduced barcode to a particular size such that the bar code may be printed at a lower resolution or with less ink or both.

It should be understood that the foregoing description is only illustrative of the disclosed embodiments. Various alternatives and modifications can be devised by those skilled in the art without departing from the disclosed embodiments. Accordingly, the disclosed embodiments is intended to embrace all such alternatives, modifications and variances which fall within the scope of the appended claims.

What is claimed is:

1. A method of producing a barcode on a printing device, the method comprising:
   collecting a set of information for producing the bar code;
   using an indicator to designate the set of information, a data amount of the indicator being smaller than a data amount of the set of information;
   storing the set of information in association with the indicator;
   encoding the indicator in a reduced barcode that is narrower than a printing width of a pen of the printing device, the reduced bar code at a first resolution;
   expanding the reduced barcode to a particular size at a lower resolution, a width of the particular size being substantially the same as the printing width of the pen, and the lower resolution being lower than the first resolution; and
   printing the reduced bar code on the printing device at the particular size and the lower resolution.

2. The method of claim 1, further comprising encoding an indication of an amount of funds into the reduced barcode.

3. The method of claim 1, further comprising utilizing the indicator to access the collected information.

4. A method of producing a postal indicia barcode on a printing device, the method comprising:
   collecting a set of information for producing the postal indicia barcode;
   using a serial number to indicate the set of information, a data amount of the serial number being smaller than a data amount of the set of information;
   storing the set of information in association with the serial number;
   encoding the serial number into a reduced postal indicia barcode that is narrower than a printing width of a pen of the printing device, the reduced postal indicia bar code at a first resolution;
   expanding the reduced postal indicia barcode to a particular size at a lower resolution, a width of the particular size being substantially the same as the printing width of the pen, and the lower resolution being lower than the first resolution; and
   applying the reduced postal indicia bar code to a mail piece, the printing device at the particular size and the lower resolution.

5. The method of claim 4, further comprising encoding an indication of a postage amount into the postal indicia barcode.

6. A meter for producing a postal indicia barcode comprising:
   a processor configured to collect a set of information for producing the postal indicia barcode, designate a serial number to indicate the set of information, a data amount of the serial number being smaller than a data amount of the set of information, encode the serial number into the postal indicia barcode, and expand the barcode to a particular size; and a printing device comprising at least one pen, the printing device configured to apply the postal indicia bar code to a mail piece via the pen, wherein, the postal indicia barcode is narrower than a printing width of a pen of the printing device, the postal indicia bar code at a first resolution; and the processor is further configured to:

expand the postal indicia barcode to a particular size at a lower resolution, a width of the particular size being substantially the same as the printing width of the pen, and the lower resolution being lower than the first resolution; and control the printing device to apply the postal indicia bar code to the mail piece at the particular size and the lower resolution.

7. The meter of claim 6, wherein the processor is configured to encode an indication of a postage amount into the postal indicia barcode.

8. The method of claim 1, further comprising utilizing the indicator to access a postage meter to obtain a part of the collected information not included in the reduced barcode.

9. The method of claim 1, further comprising utilizing the indicator to access a postal infrastructure data system to obtain a part of the collected information not included in the reduced barcode.

10. The method of claim 4, further comprising utilizing the serial number to access a database to obtain a part of the collected information not included in the reduced postal indicia barcode.

11. The method of claim 4, further comprising utilizing the serial number to access a postal infrastructure data system to obtain parts of the collected information that are not included in the reduced postal indicia barcode.

12. The method of claim 1, wherein the reduced barcode is a two-dimensional barcode.

13. The method of claim 4, wherein the reduced barcode is a two-dimensional barcode.

14. The method of claim 1, further comprising reducing an amount of ink used to apply the reduced barcode based on the resolution reduction.

15. The method of claim 4, further comprising reducing an amount of ink used to apply the reduced barcode based on the resolution reduction.

16. The meter of claim 6, wherein the processor is further configured to reduce an amount of ink used to apply the barcode based on the resolution reduction.

* * * * *